(12) United States Patent
Kikuchi

(10) Patent No.: US 6,970,710 B1
(45) Date of Patent: Nov. 29, 2005

(54) RADIO DATA COMMUNICATION APPARATUS AND RADIO DATA COMMUNICATION METHOD

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 298 days.

(21) Appl. No.: 09/621,691

(22) Filed: Jul. 21, 2000

(30) Foreign Application Priority Data

Jul. 23, 1999 (JP) ................................. 11-208446

(51) Int. Cl.$^7$ ............................................. H04Q 7/20
(52) U.S. Cl. ...................... 455/462; 455/522; 455/69; 455/458; 455/567
(58) Field of Search ............................. 455/462, 555, 455/572, 575.1, 422, 522, 574, 127, 343, 455/567, 458, 69, 343.5; 340/635, 693.1

(56) References Cited

U.S. PATENT DOCUMENTS

| | | | | |
|---|---|---|---|---|
| 5,333,176 A | * | 7/1994 | Burke et al. ................. | 455/557 |
| 5,450,613 A | * | 9/1995 | Takahara et al. ............ | 455/517 |
| 5,497,507 A | * | 3/1996 | Komaki .................... | 455/552.1 |
| 5,651,052 A | * | 7/1997 | Serrano ....................... | 455/567 |
| 5,794,146 A | * | 8/1998 | Sevcik et al. ................ | 455/434 |
| 5,802,469 A | * | 9/1998 | Nounin et al. ............ | 455/422.1 |
| 5,870,680 A | * | 2/1999 | Guerlin et al. .............. | 455/557 |
| 5,878,354 A | * | 3/1999 | Hasegawa ................... | 455/567 |
| 5,995,808 A | * | 11/1999 | Hasegawa ................... | 340/7.32 |
| 6,236,214 B1 | * | 5/2001 | Camp et al. ................. | 324/427 |
| 6,256,520 B1 | * | 7/2001 | Suzuki ........................ | 455/572 |
| 6,263,200 B1 | * | 7/2001 | Fujimoto .................. | 455/343.5 |
| 6,477,380 B1 | * | 11/2002 | Uehara et al. ........... | 455/456.1 |
| 6,501,968 B1 | * | 12/2002 | Ichimura .................... | 455/574 |

FOREIGN PATENT DOCUMENTS

| | | |
|---|---|---|
| EP | 0 703 717 A1 | 3/1996 |
| GB | 2 325 119 A | 11/1998 |
| GB | 2 326 062 A | 12/1998 |
| GB | 2 328 588 A | 2/1999 |
| GB | 2328588 A * | 2/1999 ............ H04Q 7/32 |
| WO | WO 94/17502 | 8/1994 |

* cited by examiner

*Primary Examiner*—William Trost
*Assistant Examiner*—Sharad Rampuria
(74) *Attorney, Agent, or Firm*—Sughrue Mion, PLLC

(57) ABSTRACT

A radio data communication apparatus and a radio data communication method are disclosed which prevent, even in a situation wherein a circuit state is bad and unstable, repetition of acquisition of an electric field strength and discrimination of whether or not connection is possible until the circuit state becomes good is prevented thereby to prevent drop of a processing speed of a portable terminal and increase of amounts of power consumption of the portable terminal and a radio unit. A radio portable terminal of the radio data communication apparatus includes a portable terminal section for deciding a notification condition of a circuit state based on information of power supplied to the radio portable terminal and issuing a notification of the notification condition, and a portable radio section for receiving the notification of the notification condition and notifying the portable terminal section of the circuit state when the circuit state satisfies the notification condition received from the portable terminal section. The radio portable terminal is operable to connect a radio circuit based on the circuit state of the notification received from the portable radio section to transmit and receive data to and from a server over a radio communication network, a public network and a wire communication network.

20 Claims, 10 Drawing Sheets

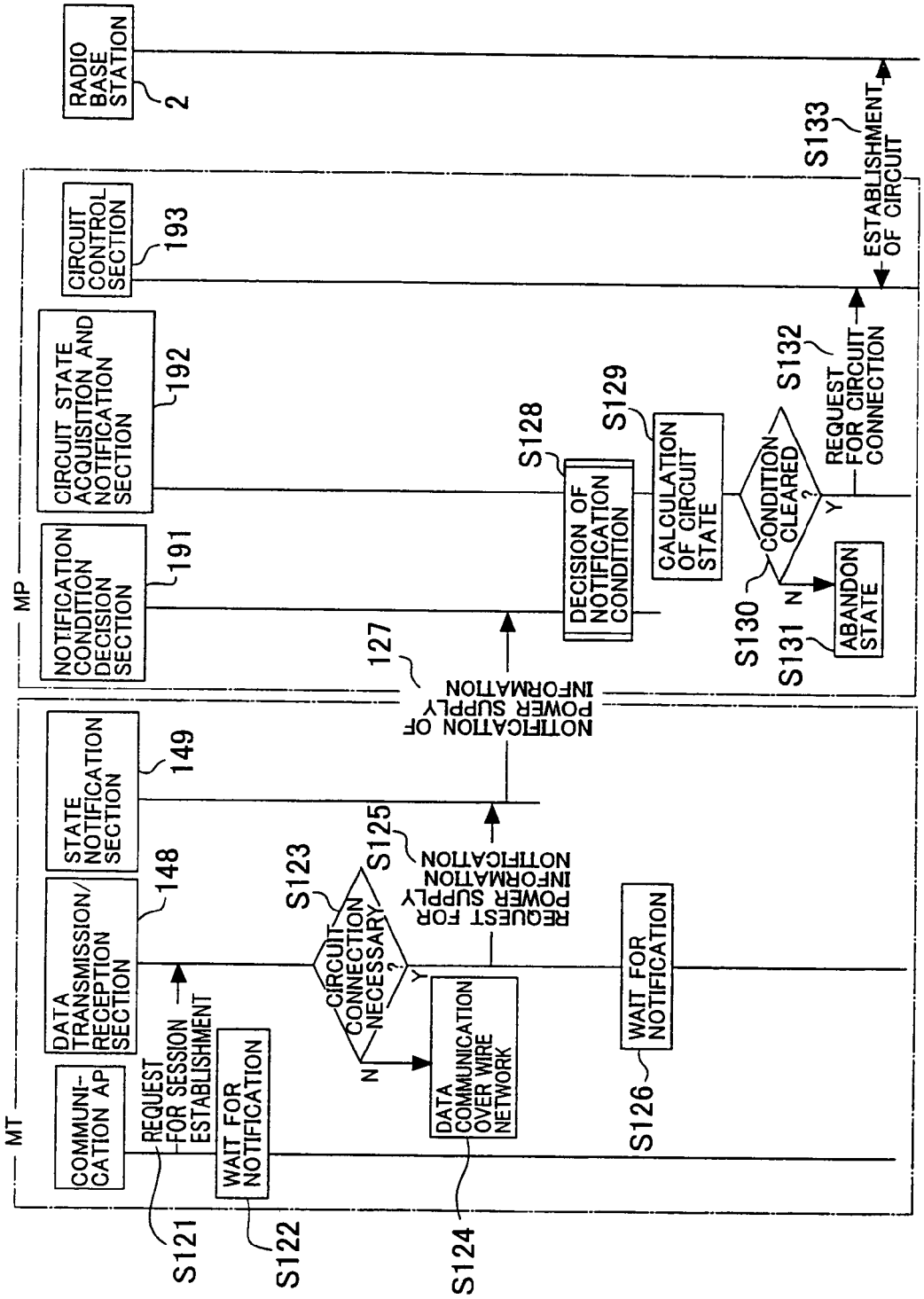

RADIO DATA COMMUNICATION APPARATUS AND RADIO DATA COMMUNICATION METHOD

BACKGROUND OF THE INVENTION

1. Field of the Invention

The present invention relates to a radio data communication technique which makes use of a circuit state notification function.

2. Description of the Related Art

Conventionally, in radio communication of a PHS (Personal Handyphone System) system or a PDC (Personal Digital Cellular) system, a radio circuit cannot be connected at such a place at which radio waves do not arrive or are less liable to arrive such as the inside of a tunnel, a location behind a building or an underground market. Therefore, a user is obliged, before communication is started, to look closely at a circuit state displayed on a radio unit (usually a circuit state is indicated by a number of antennae) and connect a radio circuit when the user determines that the radio state is good. Consequently, an operation for connection is very cumbersome.

In order to solve the problem described above, a method is proposed in Japanese Patent Application No. 78713/1998 wherein an electric field strength is acquired periodically from a radio unit and it is tried to connect a radio circuit when the acquired electric field strength exceeds a threshold value set in advance. Meanwhile, in the conventional MCPC (Mobile Computing Promotion Consortium), in order to realize the method described above, examinations have been started for interfaces among a radio unit, a terminal adapter and a portable terminal.

However, according to the method described above, in a situation wherein a circuit state is bad and unstable, acquisition of an electric field strength and discrimination of whether or not connection is possible are repeated until a good circuit state is obtained. Consequently, the method has a problem in that there is the possibility that the processing speed of the portable terminal may drop or the amounts of power consumption of the portable terminal and the radio unit may be increased by such repetition.

SUMMARY OF THE INVENTION

It is an object of the present invention to provide a radio data communication apparatus and a radio data communication method which prevent, even in a situation wherein a circuit state is bad and unstable, repetition of acquisition of an electric field strength and discrimination of whether or not connection is possible until the circuit state becomes good is prevented thereby to prevent drop of a processing speed of a portable terminal and increase of amounts of power consumption of the portable terminal and a radio unit.

In order to attain the object described above, according to an aspect of the present invention, there is provided a radio data communication apparatus, comprising a radio portable terminal including a portable terminal section for deciding a notification condition of a circuit state based on information of power supplied to the radio portable terminal and issuing a notification of the notification condition, and a portable radio section for receiving the notification of the notification condition and notifying the portable terminal section of the circuit state when the circuit state satisfies the notification condition received from the portable terminal section, the radio portable terminal being operable to connect a radio circuit based on the circuit state of the notification received from the portable radio section to transmit and receive data to and from a server over a radio communication network, a public network and a wire communication network.

The radio data communication apparatus may be constructed such that the portable terminal section includes means for notifying the portable radio section of the power supply information supplied to the portable terminal section, and the portable radio section includes means for deciding a notification condition of the circuit state based on the power supply information of the notification received and notifying the portable terminal section of the circuit state when the circuit state satisfies the notification condition.

As an alternative, the radio data communication apparatus may be constructed such that the portable terminal section includes means for notifying the portable radio section of the information of the power supply supplied to the portable terminal section, and the portable radio section includes means for determining a notification condition of the circuit state based on the power supply information of the notification received and connecting a circuit when the circuit state satisfies the notification condition.

Preferably, the power supply information includes power supply type information which is information indicative of whether the power supply being supplied is an ac power supply or a battery, and information indicative of a battery remaining amount where the power supply is a battery.

Preferably, the circuit state includes at least one of a reception electric field strength which is a strength of radio waves received from a radio base station by the portable radio section, and a state of a circuit indicated by an error rate of control data received from the radio base station by the portable radio section.

As another alternative, the radio data communication apparatus may be constructed such that the portable terminal section includes means for determining a notification condition of the circuit state based on an operation state of a CPU of the portable terminal section and notifying the portable radio section of the notification condition, and the portable radio section includes means for notifying the portable terminal section of the circuit state when the circuit state satisfies the condition received from the portable terminal section.

Alternatively, the radio data communication apparatus may be constructed such that the portable terminal section includes means for notifying the portable radio section of an operation state of a CPU of the portable terminal section, and the portable radio section includes means for deciding a notification condition of the circuit state based on the operation state of the CPU of the notification received and notifying the portable terminal section of the circuit state when the circuit state satisfies the notification condition.

Else, the radio data communication apparatus may alternatively be constructed such that the portable terminal section includes means for notifying the portable radio section of an operation state of a CPU of the portable terminal section, and the portable radio section includes means for deciding a notification condition of the circuit state based on the operation state of the CPU of the notification received and connecting a circuit when the circuit state, satisfies the notification condition.

Preferably, the operation state of the CPU includes information representative of operation states wherein a processing speed of the CPU and/or an amount of power consumption of the power supply are different.

According to another aspect of the present invention, there is provided a radio data communication method, comprising a portable terminal step performed by a radio portable terminal for deciding a notification condition of a circuit state based on information of power supply supplied to the radio portable terminal and issuing a notification of the notification condition, a portable radio step performed by the radio portable terminal for receiving the notification of the notification condition and notifying the portable terminal step of the circuit state when the circuit state satisfies the condition received from the portable terminal step, and a connection step performed by the radio portable terminal of connecting a radio circuit based on the circuit condition of the notification received from the portable radio step to transmit and receive data to and from a server over a radio communication network, a public network and a wire communication network.

The radio data communication method may be constructed such that the portable terminal step includes a step of notifying the portable radio step of the power supply information supplied to the portable terminal step, and the portable radio step includes a step of deciding a notification condition of the circuit state based on the power supply information of the notification received and notifying the portable terminal step of the circuit state when the circuit state satisfies the condition.

As an alternative, the radio data communication method may be constructed such that the portable terminal step includes a step of notifying the portable radio step of the information of the power supplied to the portable terminal step, and the portable radio step includes a step of determining a notification condition of the circuit state based on the power supply information of the notification received and connecting a circuit when the circuit state satisfies the condition.

Preferably, the power supply information includes power supply type information which is information indicative of whether the power supply being supplied is ac power supply or a battery, and information indicative of a battery remaining amount where the power supply is a battery.

Preferably, the circuit state includes at least one of a reception electric field strength which is a strength of radio waves received from a radio base station by the portable radio step, and a state of a circuit indicated by an error rate of control data received from the radio base station by the portable radio step.

As another alternative, the radio data communication method may be constructed such that the portable terminal step includes a step of determining a notification condition of the circuit state based on an operation state of a CPU of the portable terminal step and notifying the portable radio step of the notification condition, and the portable radio step includes a step of notifying the portable terminal step of the circuit state when the circuit state satisfies the condition received from the portable terminal step.

Alternatively, the radio data communication method may be constructed such that the portable terminal step includes a step of notifying the portable radio step of an operation state of a CPU of the portable terminal step, and the portable radio step includes a step of deciding a notification condition of the circuit state based on the operation state of the CPU of the notification received and notifying the portable terminal step of the circuit state when the circuit state satisfies the condition.

Else, the radio data communication method may be constructed such that the portable terminal step includes a step of notifying the portable radio step of an operation state of a CPU of the portable terminal step, and the portable radio step includes a step of deciding a notification condition of the circuit state based on the operation state of the CPU of the notification received and connecting a circuit when the circuit state satisfies the condition.

Preferably, the operation state of the CPU includes information representative of operation states wherein a processing speed of the CPU and/or an amount of power consumption of the power.

With the radio data communication apparatus and the radio data communication method, even in a situation wherein a circuit state is bad and unstable, repetition of acquisition of an electric field strength and discrimination of whether or not connection is possible is prevented until the circuit state becomes good. As a result, the radio data communication apparatus and the radio data communication method are advantageous in that drop of a processing speed of a portable terminal and increase of amounts of power consumption of the portable terminal and a radio unit can be prevented.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 10 is a flow chart illustrating operation of the radio data communication apparatus of FIG. 1 where the radio portable terminal shown in FIG. 9 is used.

DESCRIPTION OF THE PREFERRED EMBODIMENT

Figure 1:
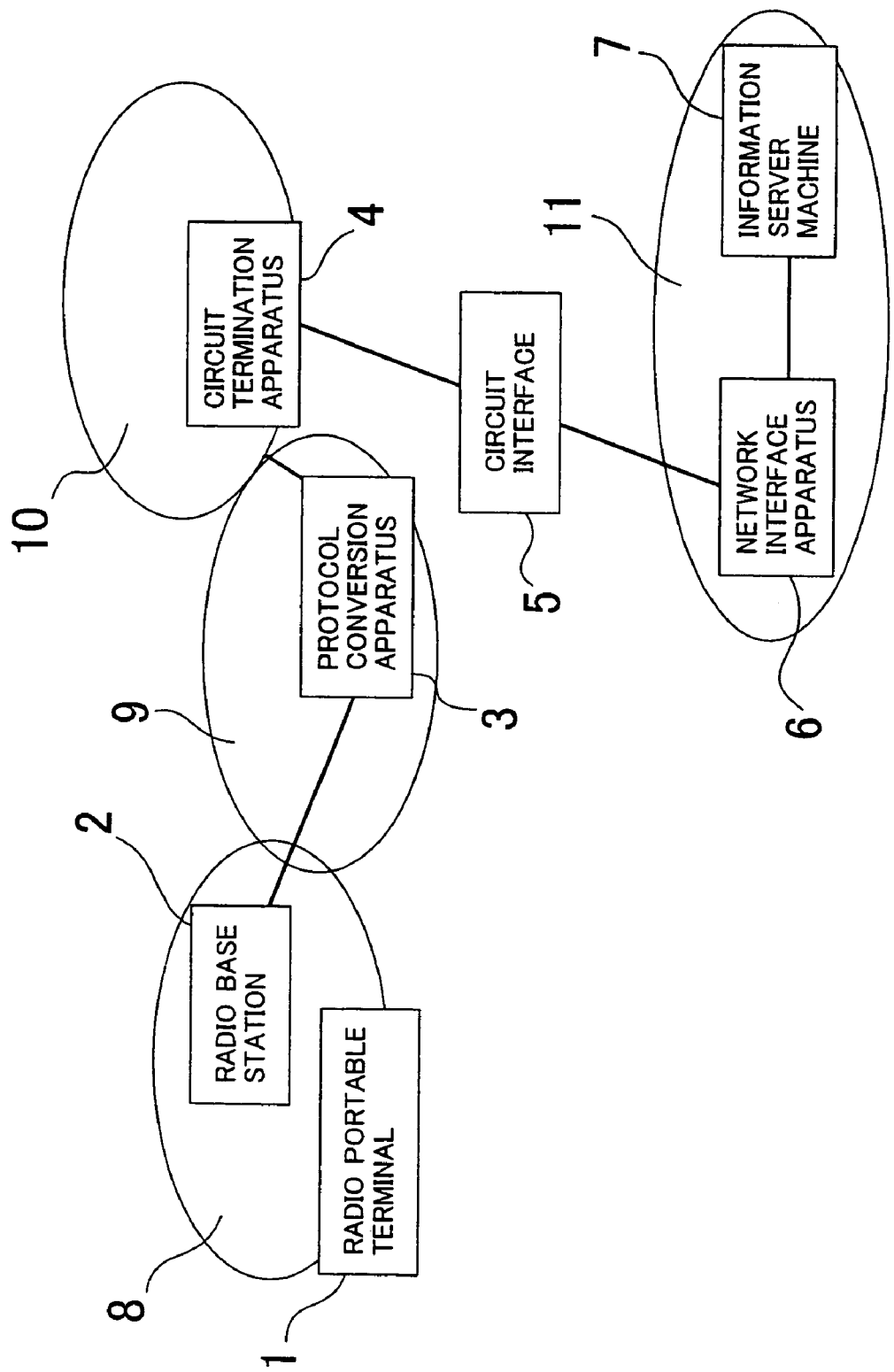
FIG. 1 is a diagrammatic view showing a basic construction of a radio data communication apparatus to which the present invention is applied.

Referring first to FIG. 1, there is shown a basic construction of a radio data communication apparatus to which the present invention is applied. The radio data communication apparatus shown includes a radio portable terminal 1, a radio base station 2, a protocol conversion apparatus 3, a circuit termination apparatus 4, a circuit interface 5, a network interface apparatus 6, an information server machine 7, a unit radio area 8, a radio communication network 9, a public network 10 and a wire communication network 11. The radio portable terminal 1 transmits and receives data to and from the information server machine 7 over the radio communication network 9, public network 10 and wire communication network 11. The radio communication network 9 is a communication network which makes use of, for example, a PHS (Personal Handyphone System) system, a PDC (Personal Digital Cellular) system or any other suitable system to connect the radio base station 2, which establishes a circuit to the radio portable terminal 1 which is present in the unit radio area 8, and the public network 10 to each other through the protocol conversion apparatus 3 by which data to be communicated between the radio communication network 9 and the public network 10 is converted in accordance with the communication network. The public network 10 may be, for example, a PSTN (Public Switched Telephone Network) or an ISDN (Integrated Services Digital Network) and is connected to the wire communication network 11 through the circuit termination apparatus 4 such as, for example, a DSU (Digital Service Unit) and the circuit interface 5 such as a modem. Further, the wire communication network 11 connects to the information server machine 7 through the network interface apparatus 6 such as a router making use of, for example, a LAN (Local Area Network) or the like.

Figure 2:
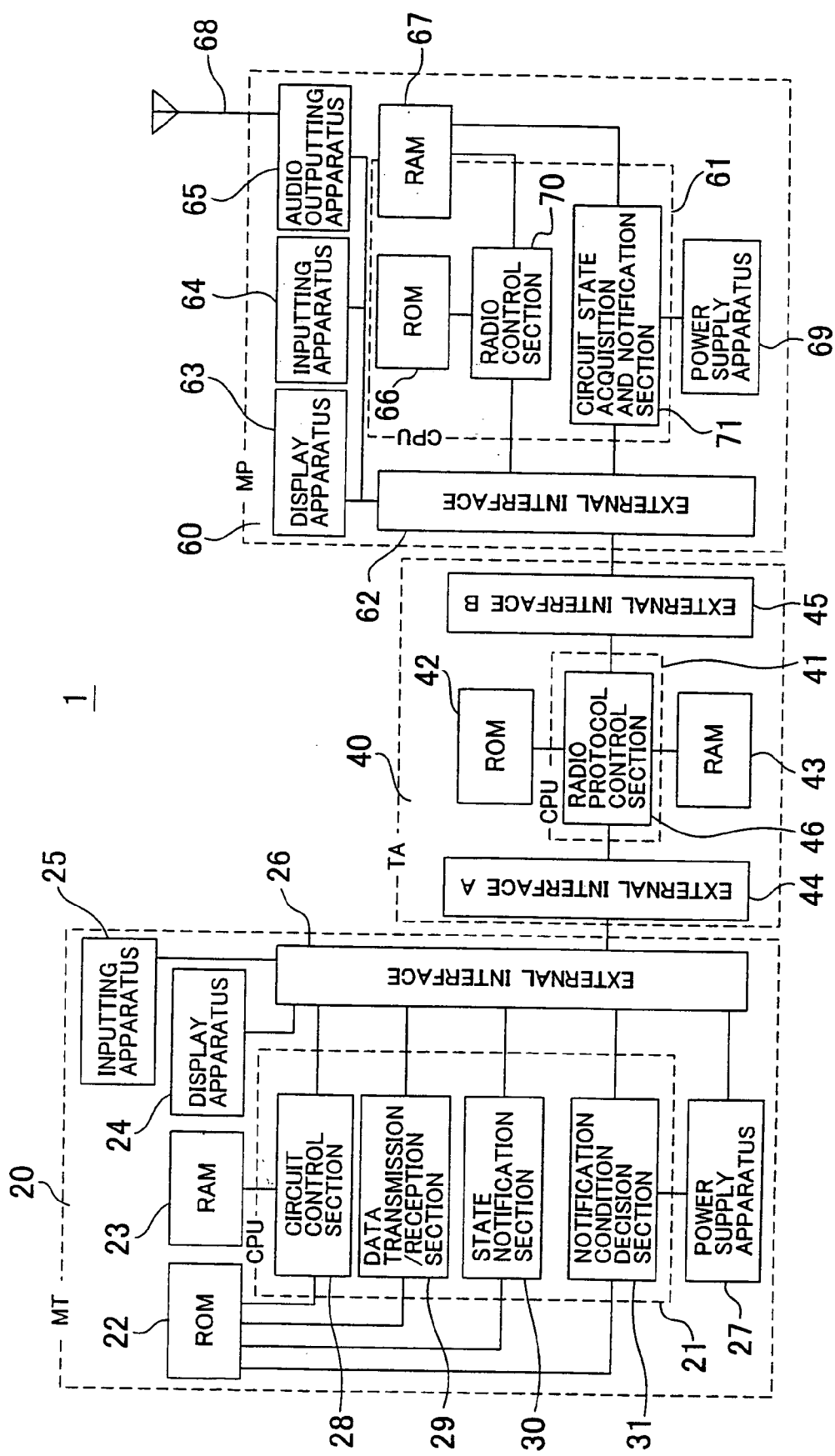
FIG. 2 is a block diagram showing a form of a radio portable terminal of the radio data communication apparatus shown in FIG. 1.

FIG. 2 shows a form of the radio portable terminal 1 shown in FIG. 1. Referring to FIG. 2, the radio portable terminal 1 shown includes a portable terminal section 20 (MT), a terminal adapter section 40 (TA), and a portable radio section 60 (MP).

The portable terminal section 20 (MT) includes a CPU 21, a ROM 22, a RAM 23, a display apparatus 24, an inputting apparatus 25, an external interface 26, a power supply apparatus 27, a circuit control section 28, a data transmission/reception section 29, a state notification section 30, and a notification condition decision section 31.

The CPU 21 controls operation of the entire portable terminal section 20 (MT) and executes a program stored in the ROM 22 or/and the RAM 23 to enable the circuit control section 28, data transmission/reception section 29, state notification section 30 and notification condition decision section 31. The CPU 21 has a plurality of operation states wherein, for example, the processing speed and the amount of power consumption of the power supply are different. The ROM 22 has control programs such as, for example, a BIOS (Basic Input/Output system) and control data stored therein in advance. The RAM 23 temporarily or permanently stores a communication program, data to be transmitted or received, and so forth. The display apparatus 24 may be a CRT (Cathode Ray Tube) display unit, a LCD (Liquid Crystal Display) unit or any other suitable display unit and displays a display screen of a program, a circuit state or the like. The inputting apparatus 25 may be a keyboard, a button apparatus or any other suitable inputting apparatus and is operated by a user to input required information. The external interface 26 allows communication of a control command, data and so forth between the CPU 21 and an external apparatus such as the display apparatus 24, inputting apparatus 25 or terminal adapter section 40 (TA). The power supply apparatus 27 may employ a battery or an AC (Alternating Current) power supply as an operating power supply and can effect discrimination between a battery and an AC power supply and detection of a remaining amount of the battery. The circuit control section 28 notifies the notification condition decision section 31 that a connection request has been received from a communication program and connects a circuit at a timing at which a notification of a circuit state is received from the portable radio section 60 (MP). The data transmission/reception section 29 transmits and receives data to and from the information server machine 7 after a circuit is connected. The state notification section 30 notifies the notification condition decision section 31 of power supply information acquired from the power supply apparatus 27 and an operation state of the CPU 21. The notification condition decision section 31 decides a notification condition based on the power supply information and the operation state of the CPU 21 and notifies the portable radio section 60 (MP) of the notification condition through the external interface 26.

The terminal adapter section 40 (TA) a CPU 41, a ROM 42, a RAM 43, an external interface A44, another external interface B 45, and a radio protocol control section 46.

The CPU 41 controls operation of the entire terminal adapter section 40 (TA) and executes a program stored in the ROM 42 or the RAM 43 to enable the radio protocol control section 46. The ROM has control programs such as, for example, a BIOS and control data stored therein in advance. The RAM 43 temporarily stores a control command or data to be outputted to or inputted from an external interface B 45. The external interface A 44 allows communication of a control command, data or the like between the CPU 41 and the portable terminal section 20 (MT). The external interface B 45 allows communication of a control command, data or the like between the portable radio section 60 (MP) and the CPU 41. The radio protocol control section 46 effects processing based on specifications for performing data communication in such a radio environment as the PIAFS (PHS Internet Access Forum Standard). It is to be noted that the radio portable terminal 1 may possibly be modified such that the radio protocol control section 46 is incorporated not in the terminal adapter section 40 (TA) but in the portable terminal section 20 (MT) or the portable radio section 60 (MP).

The portable radio section 60 (MP) includes a CPU 61, an external interface 62, a display apparatus 63, an inputting apparatus 64, an audio outputting apparatus 65, a ROM 66, a RAM 67, an antenna 68, a power supply apparatus 69, a radio control section 70, and a circuit state acquisition and notification section 71.

The CPU 61 controls operation of the entire portable radio section 60 (MP) and executes a program stored in the ROM 66 or the RAM 67 to enable the radio control section 70 and the circuit state acquisition and notification section 71. The ROM 66 has, for example, a telephone number of the terminal and so forth stored in advance therein. The RAM 67 temporarily or permanently stores a control program, a telephone number of the other party and so forth therein. The display apparatus 63 may be, for example, a LCD and displays a communication state, a telephone number of the other party and so forth. The inputting apparatus 64 may be, for example, a button apparatus and can be operated by a user to input required information. The audio outputting apparatus 65 outputs a ringing tone or voice of the other party. The external interface 62 allows communication of a control command, data and so forth between the CPU 61 and an external apparatus such as the display apparatus 63, inputting apparatus 64, audio outputting apparatus 65 and terminal adapter section 40 (TA). The antenna 68 transmits and receives radio waves to and from the radio base station 2. The power supply apparatus 69 may employ a battery or an AC power supply as an operating power supply and effects discrimination between a battery and an AC power supply and detection of a remaining amount of the battery. The radio control section 70 performs radio control such as call connection upon origination or termination of a call and switching of a connection upon movement to or from the unit radio area 8. The circuit state acquisition and notification section 71 calculates a circuit state based on a notification condition of a notification received from the portable terminal section 20 (MT) and notifies the portable terminal section 20 (MT) of the circuit state through the external interface 62 when the calculated circuit state satisfies the condition. It is to be noted that the radio portable terminal 1 may possibly be modified such that the power supply apparatus 69 of the portable radio section 60 (MP) is omitted and the portable radio section 60 (MP) receives supply power from the power supply apparatus 27 of the portable terminal section 20 (MT).

Figure 3:
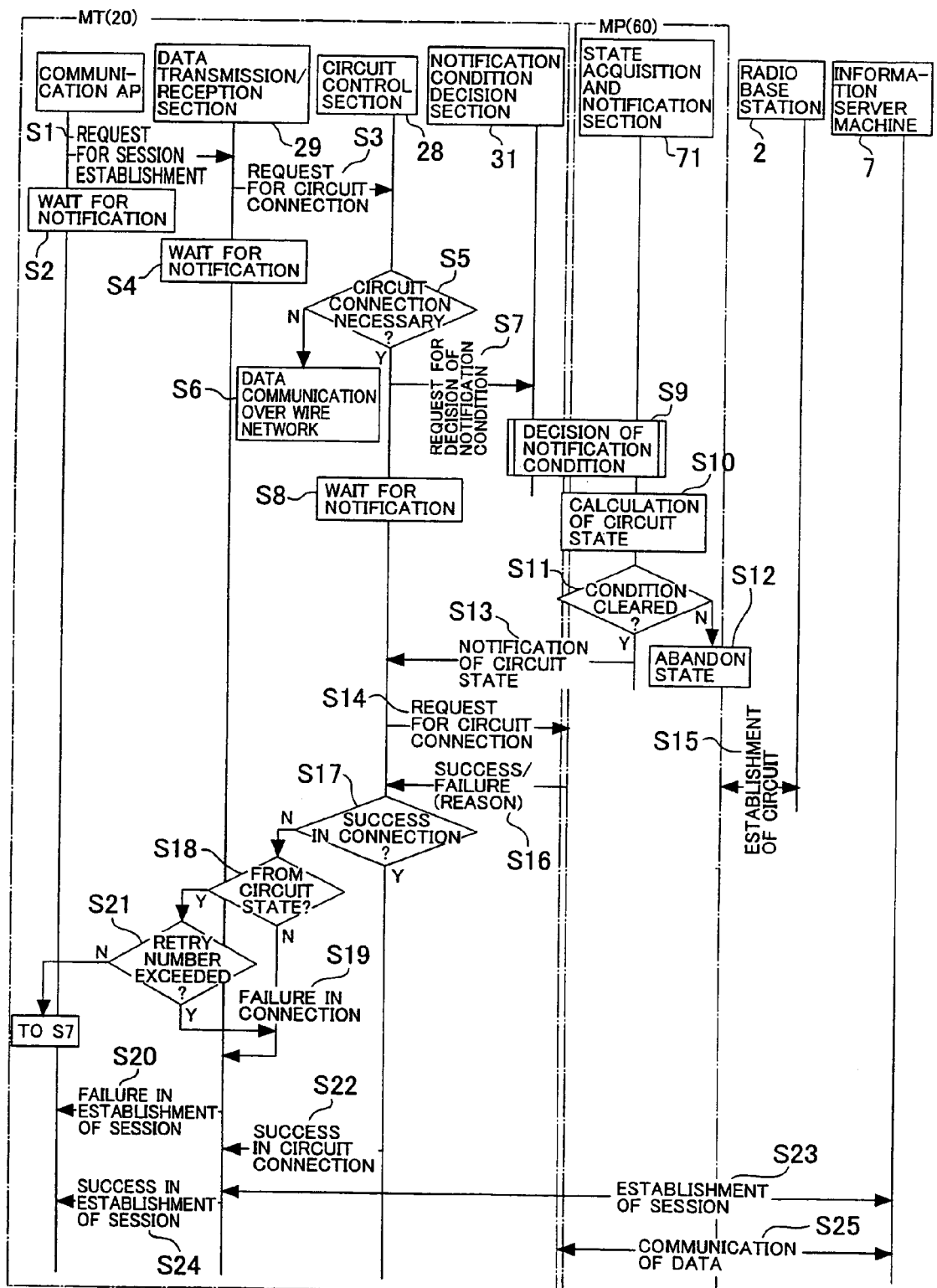
FIG. 3 is a flow chart illustrating operation of the radio data communication apparatus of FIG. 1.

In the following, operation of the radio data communication apparatus including the radio portable terminal 1 of FIG. 2 where a communication application in which the radio data communication method is described is activated and a circuit is connected at a timing at which a notification of a circuit state is received from the portable terminal section 20 (MT) and then data is transmitted to the information server machine 7 is described with reference to FIG. 3. Referring to FIG. 3, if a data transmission opportunity first occurs by an operation of a user, then the communication application requests the data transmission/reception section 29 for establishment of a session (step S1) and waits until it receives a "session establishment success/failure" notification from the data transmission/reception section 29 (step S2).

In response to the session establishment success/failure notification, the data transmission/reception section 29 issues a connection request to the circuit control section 28 (step S3) and waits until it receives a "circuit connection success/failure" notification from the circuit control section 28 (step S4).

In response to the connection request, the circuit control section 28 confirms necessity/non-necessity for connection of a radio circuit from hardware setting of the portable terminal section 20 (MT) or presence or absence of the terminal adapter section 40 (TA) (step S5). If the discrimination is in the affirmative (Y in step S5), then the processing advances to step S7, in which the circuit control section 28 issues a request for decision of a notification condition to the notification condition decision section 31 (step S7). Then, the circuit control section 28 waits until a notification of a circuit state is received from the portable radio section 60 (MP) (step S8). On the other hand, if the discrimination is in the negative in step S5 (N in step S5), then the processing advances to step S6, in which the circuit control section 28 performs data transmission which is outside the scope of the present invention over the wire network (step S6).

In response to the request for decision of a notification condition from the circuit control section 28, the notification condition decision section 31 cooperates with the circuit state acquisition and notification section 71 of the portable radio section 60 (MP) to decide a notification condition of a circuit state (step S9).

Based on the notification condition thus decided, the circuit state acquisition and notification section 71 calculates a circuit state (step S10) and confirms whether or not the calculated value clears the notification condition (step S11). If the discrimination is in the affirmative (Y in step S11), then the processing advances to step S13, in which the circuit state acquisition and notification section 71 notifies the portable terminal section 20 (MT) of the circuit state (step S13). However, if the discrimination is in the negative (N in step S11), then the processing advances to step S12, in which the circuit state acquisition and notification section 71 abandons the state of the notification received (step S12).

In response to the notification of the circuit state, the circuit control section 28 notifies the portable radio section 60 (MP) of a circuit connection request at a timing at which the notification of the circuit state is received (step S14).

In response to the notification, the portable radio section 60 (MP) performs establishment of a circuit to the radio base station 2 (step S15) and checks whether or not a circuit has been established successfully. If the establishment of a circuit has failed, then the portable radio section 60 (MP) notifies the portable terminal section 20 (MT) of a reason of the failure (step S16).

In response to the notification, the circuit control section 28 confirms whether or not a circuit has been established successfully (step S17). If the discrimination is in the affirmative (Y in step S17), then the processing advances to step S22, but if the discrimination is in the negative (N in step S17), then the processing advances to step S18, in which the circuit control section 28 confirms whether or not the reason of the failure arises from the circuit state (step S18). If the result of the confirmation is in the affirmative (Y in step S18), then the processing advances to step S21, but if the result of the confirmation is in the negative (N in step S18), then the processing advances to step S19, in which the circuit control section 28 notifies the data transmission/reception section 29 of "circuit connection failure" (step S19).

In response to the notification, the data transmission/reception section 29 notifies the communication application of "session connection failure" (step S20).

Operation of the communication application after this depends upon installation of the application. In step S21, the communication application confirms whether or not a number of times of retrying set in advance by the user is exceeded. If the discrimination is in the affirmative (Y in step S21), then the processing advances to step S20, but if the discrimination is in the negative (N in step S21), then the processing advances to step S7. In step S22, the communication application notifies the data transmission/reception section 29 of "circuit connection success".

In response to the notification, the data transmission/reception section 29 establishes a session with the information server machine 7 (step S23) and notifies the communication application of "session connection success" (step S24). Thereafter, data is transmitted from the portable terminal section 20 (MT) to the information server machine 7 (step S25).

The process of deciding a notification condition of a circuit state in step S9 is described with reference to FIG. 4. In the process of deciding a notification condition of a circuit state in step S9, the notification condition decision section 31 first reads a selected one of notification condition decision tables given below as Table, 1, Table 2 and Table 3 into the RAM 23 (step S41) and then issues a function acquisition request to the circuit state acquisition and notification section 71 of the portable radio section 60 (MP) (step S42). The notification condition decision tables are prepared in the RAM 23 or the RAM 67 in advance and can be modified or selectively used by a user, and a notification interface between the portable terminal section 20 (MT) and the portable radio section 60 (MP) is decided in advance.

TABLE 1

| Power supply type | Battery remaining amount | Notification condition (when maximum number of stages of circuit state is four) |
|---|---|---|
| AC power | — | 1 stage or more |
| Battery | 80% or more | 2 stages or more |
|  | 30 to 80% | 3 stages or more |
|  | 30% or less | 4 stages or more |

TABLE 2

| Power supply type | Battery remaining amount | Notification condition (when minimum acquisition interval = 1 second) |
|---|---|---|
| AC power | — | 1 stage or more |
| Battery | 80% or more | 2 stages or more |
|  | 30 to 80% | 3 stages or more |
|  | 30% or less | 4 stages or more |

TABLE 3

| Power supply type | Battery remaining amount | Notification condition (when 4 stages, acquisition interval = 1 second) |
|---|---|---|
| AC power | — | acquisition for each 1 second, notification with 1 or more stages |
| Battery | 80% or more | average in 2 acquisitions for each 1 second is 2 stages or more |
|  | 30 to 80% | average in 3 acquisitions for each 1 second is 3 stages or more |
|  | 30% or less | average in 4 acquisitions for each 1 second is 4 stages or more |

In response to the function acquisition request from the notification condition decision section 31, the circuit state acquisition and notification section 71 notifies the notification condition decision section 31 of the portable terminal section 20 (MT) of a minimum distance which can be acquired by the portable radio section 60 (MP) and a stage of the circuit state (step S43).

In response to the notification, the notification condition decision section 31 modifies the contents of the selected table into such a table as given by Table 4 below based on the function of the notification received (step S44) and issues a power supply information notification request to the state notification section 30 (step S45).

TABLE 4

| Power supply type | Battery remaining amount | Notification condition (when maximum number of stages of circuit state is 4) | Notification condition (when maximum number of stages of circuit state is 16) |
|---|---|---|---|
| AC power | — | 1 stage or more | 1 stage or more |
| Battery | 80% or more | 2 stages or more | 5 stages or more |
|  | 30 to 80% | 3 stages or more | 9 stages or more |
|  | 30% or less | 4 stages or more | 13 stages or more |

In response to the power supply information notification request from the notification condition decision section 31, the state notification section 30 notifies the notification condition decision section 31 of information representative of whether the power supplied thereto is an AC power supply or a battery and information indicative of a remaining amount of the battery where the power supply is a battery (step S46).

In response to the notification, the notification condition decision section 31 decides a notification condition based on the information and the modified (or selected) table (step S47) and notifies the circuit state acquisition and notification section 71 of the portable radio section 60 (MP) of the decided condition (step S48).

Figure 4:
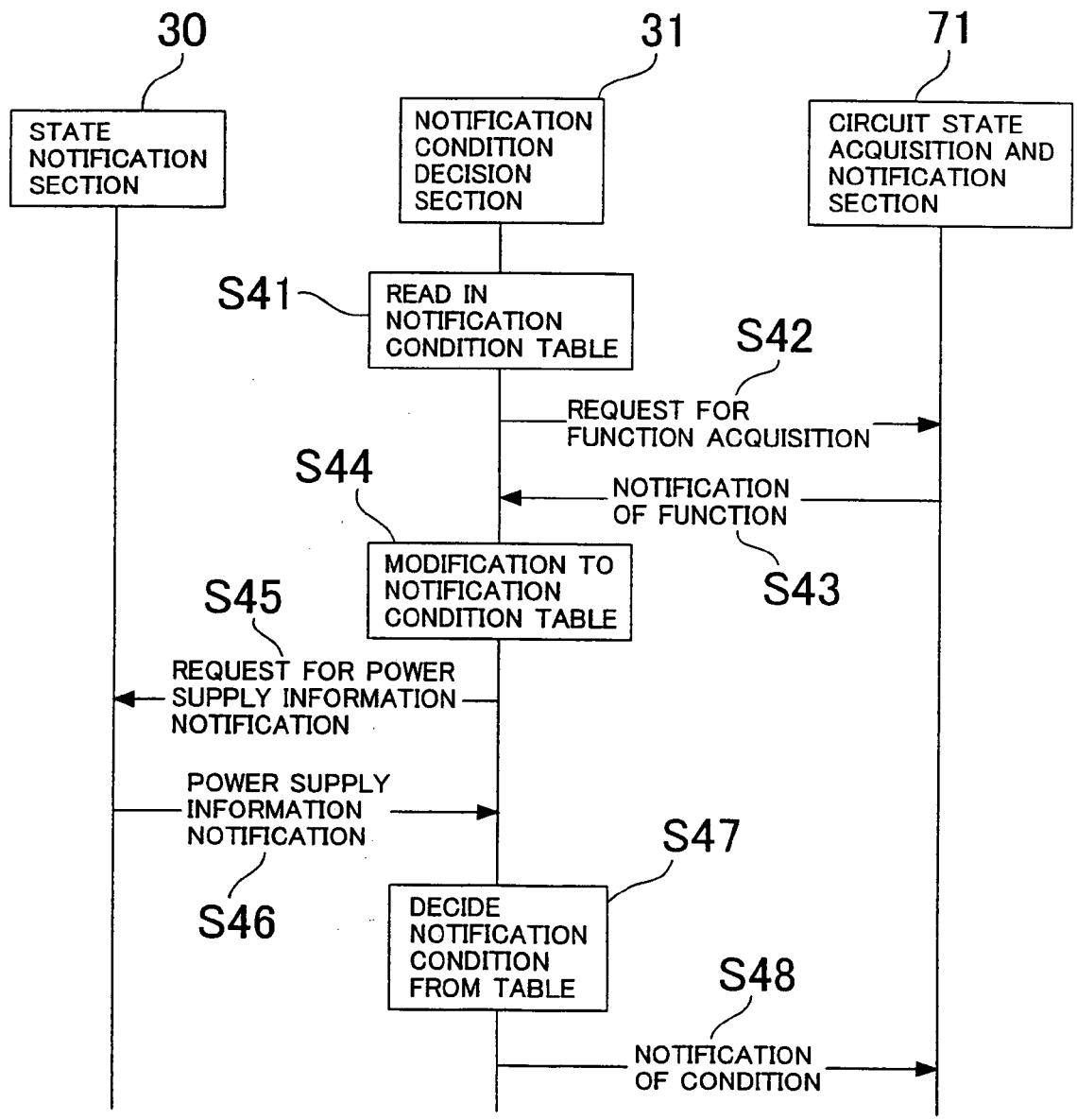
FIG. 4 is a flow chart illustrating a process of deciding a notification condition of a circuit state in step S9 of the flow chart of FIG. 3.
Figure 5:
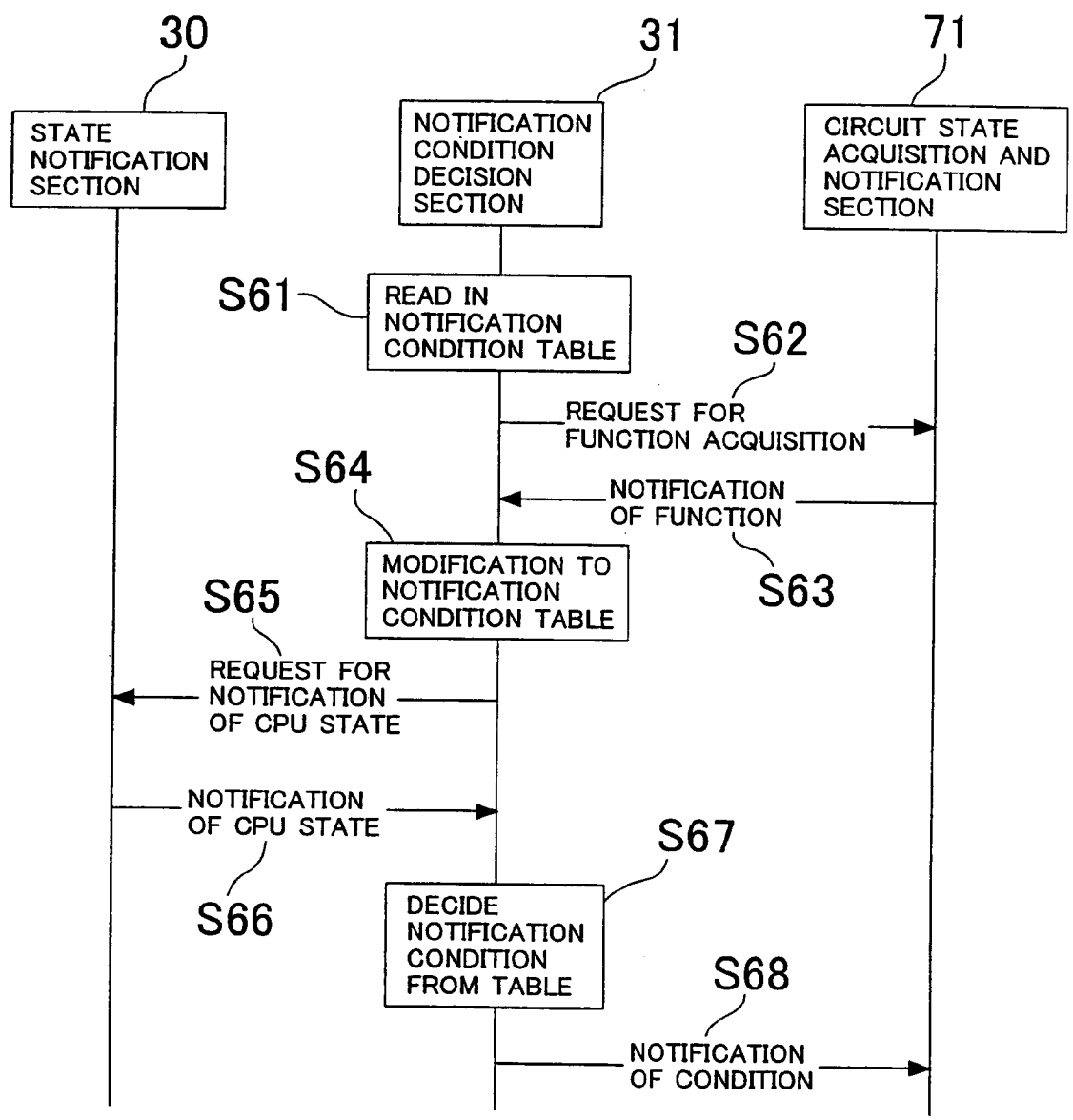
FIG. 5 is a similar view but illustrating another process of deciding a notification condition of a circuit state in step S9 of the flow chart of FIG. 3.

The radio portable terminal 1 of FIG. 2 may be modified such that, in place of the function of notifying the notification condition decision section 31 of power supply information acquired from the power supply apparatus 27, a function of notifying the notification condition decision section 31 of a state of the CPU 21 is provided for the state notification section 30 and, in place of the process in step S9 of realizing the operation of the radio data communication apparatus illustrated in FIG. 3, that is, in place of the process illustrated in FIG. 4, a process illustrated in FIG. 5 is executed.

Referring to FIG. 5, the notification condition decision section 31 in the modified radio portable terminal 1 reads a selected one of notification condition decision tables given below as Table 5, Table 6 and Table 7 into the RAM 23 (step S61) and issues a function acquisition request to the circuit state acquisition and notification section 71 of the portable radio section 60 (MP) (step S62).

TABLE 5

| CPU operation state | Notification condition (when minimum acquisition interval = 1 second) |
|---|---|
| CPU operation 1 | 1 stage or more |
| CPU operation 2 | 2 stages or more |
| CPU operation 3 | 3 stages or more |
| CPU operation 4 | 4 stages or more |

TABLE 6

| CPU operation state | Notification condition (when minimum acquisition interval = 1 second) |
|---|---|
| CPU operation 1 | acquisition for each 1 second |
| CPU operation 2 | acquisition for each 2 seconds |
| CPU operation 3 | acquisition for each 3 seconds |
| CPU operation 4 | acquisition for each 4 seconds |

TABLE 7

| CPU operation state | Notification condition (when 4 stages, acquisition interval = 1 second) |
|---|---|
| CPU operation 1 | acquisition for each 1 second, notification with 1 or more stages |
| CPU operation 2 | average in 2 acquisitions for each 1 second is 2 stages or more |
| CPU operation 3 | average in 3 acquisitions for each 1 second is 3 stages or more |
| CPU operation 4 | average in 3 acquisitions for each 2 seconds is 4 stages or more |

In response to the function acquisition request from the notification condition decision section 31, the circuit state acquisition and notification section 71 notifies the notification condition decision section 31 of the portable terminal section 20 (MT) of a minimum acquisition interval which can be acquired by the portable radio section 60 (MP) and a stage of the circuit state (step S63). In response to the notification, the notification condition decision section 31 modifies the contents of the selected table into such a table as given by Table 8 below based on the notification (step S64) and issues a state notification request of the CPU 21 to the state notification section 30 (step S65). In response to the state notification request, the state notification section 30 notifies the notification condition decision section 31 of information indicative of in which state the CPU 21 is operating (step S66). In response to the notification, the notification condition decision section 31 decides such a notification condition as illustrated in Table 8 based on the information from the state notification section 30, that is, the information indicative of in which state the CPU 21 is operating and the modified (or selected) table described above (step S67) and then notifies the circuit state acquisition and notification section 71 of the portable radio section 60 (MP) of the decided condition (step S68).

TABLE 8

| CPU operation state | Notification condition (when maximum number of stages of circuit state is 4) | After modification (when maximum number of stages of circuit state is 16) |
|---|---|---|
| Operation state 1 | 1 stage or more | 1 stage or more |
| Operation state 2 | 2 stages or more | 5 stages or more |
| Operation state 3 | 3 stages or more | 9 stages or more |
| Operation state 4 | 4 stages or more | 16 stages or more |

Further, the radio portable terminal 1 of FIG. 2 described above may be modified such that both of the function of notifying the notification condition decision section 31 of power supply information acquired from the power supply apparatus 27 described particularly with reference to FIG. 4 and the function of notifying the notification condition decision section 31 of a state of the CPU 21 described above particularly with reference to FIG. 5 are provided for the state notification section 30, and the state notification section 30 executes the process in step S9 of realizing the operation illustrated in FIG. 3.

Figure 6:
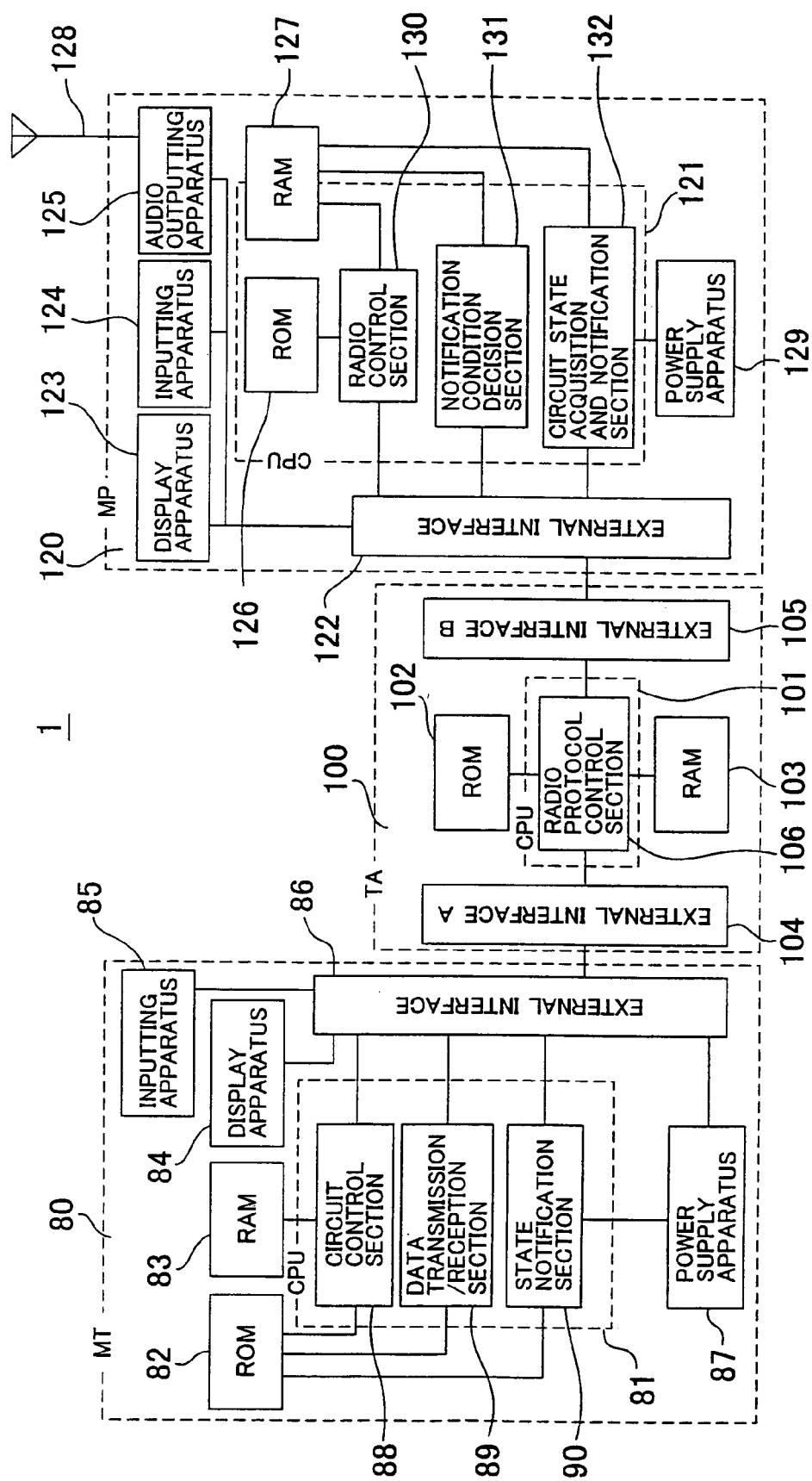
FIG. 6 is a block diagram showing another form of the radio portable terminal of the radio data communication apparatus shown in FIG. 1.

Referring now to FIG. 6, there is shown another form of the radio portable terminal 1 shown in FIG. 1. The radio portable terminal 1 shown in FIG. 6 is a modification to but is different from the radio portable terminal described hereinabove with reference to FIG. 2 in that a component corresponding to the notification condition decision section 31 is included not in a component corresponding to the portable terminal section 20 (MT) but in a component corresponding to the portable radio section 60 (MP).

In particular, the radio portable terminal 1 includes a portable terminal section 80 (MT), a terminal adapter section 100 (TA) and a portable radio section 120 (MP).

The portable terminal section 80 (MT) includes a CPU 81, a ROM 82, a RAM 83, a display apparatus 84, an inputting apparatus 85, an external interface 86, a power supply apparatus 87, a circuit control section 88, a data transmission/reception section 89, and a state notification section 90.

The CPU 81 controls operation of the entire portable terminal section 80 (MT) and executes a program stored in the ROM 82 or/and the RAM 83 to enable the circuit control section 88, data transmission/reception section 89 and state notification section 90. The CPU 21 thus has a plurality of operation states wherein, for example, the processing speed and the amount of power consumption of the power supply are different. The ROM 82 has control programs such as, for example, a BIOS and control data stored therein in advance. The RAM 83 temporarily or permanently stores a communication program, data to be transmitted or received, and so forth. The display apparatus 84 may be a CRT display unit, a LCD (Liquid Crystal Display) unit or some other suitable display apparatus and displays a display screen of a program, a circuit state or the like. The inputting apparatus 85 may be a keyboard, a pen or any other suitable inputting apparatus and can be operated by a user to input required information. The external interface 86 allows communication of a control command, data and so forth between the CPU 81 and an external apparatus such as the display apparatus 84, inputting apparatus 85 or terminal adapter section 100 (TA). The power supply apparatus 87 may use a battery or an AC power supply as an operating power supply and can effect discrimination between a battery and an AC power supply and detection of a remaining amount of the battery. The circuit control section 88 connects a circuit at a timing at which a notification of a circuit state is received from the portable radio section 120 (MP). The data transmission/reception section 89 transmits and receives data to and from the information server machine 7 shown in FIG. 1 after a circuit is connected. The state notification section 90 notifies a notification condition decision section 131 of the portable radio section 120 (MP), which is hereinafter described, of power supply information acquired from the power supply apparatus 87 and an operation state of the CPU 81.

The terminal adapter section 100 (TA) includes a CPU 101, a ROM 102, a RAM 103, an external interface A 104, another external interface B 105, and a radio protocol control section 106.

The CPU 101 controls operation of the entire terminal adapter section 100 (TA) and executes a program stored in the ROM 102 or the RAM 103 to enable the radio protocol control section 106. The ROM 102 has control programs such as, for example, a BIOS and control data stored therein in advance. The RAM 103 temporarily stores a control command or data to be outputted to or inputted from the external interface B 105. The external interface A 104 allows communication of a control command, data or the like between the portable terminal section 80 (MT) and the CPU 101. The external interface B 105 allows communication of a control command, data or the like between the portable radio section 120 (MP) and the CPU 101. The radio protocol control section 106 performs processing based on specifications for performing data communication in such a radio environment as the PIAFS.

The portable radio section 120 (MP) includes a CPU 121, a ROM 126, a RAM 127, a display apparatus 123, an inputting apparatus 124, an audio outputting section 125, an external interface 122, an antenna 128, a power supply apparatus 129, a radio control section 130, a notification condition decision section 131, and a circuit state acquisition and notification section 132.

The CPU 121 controls operation of the entire portable radio section 120 (MP) and executes a program stored in the ROM 126 or the RAM 127 to enable the radio control section 130 and the circuit state acquisition and notification section 132. The ROM 126 has, for example, a telephone number of the terminal and so forth stored therein in advance. The RAM 127 temporarily or permanently stores a control program, a telephone number of the other party and so forth. The display apparatus 123 may be, for example, a LCD and displays a communication state, a telephone number of the other party and so forth thereon. The inputting apparatus 124 may be, for example, a button and can be operated by a user to input required information. The audio outputting section 125 outputs a ringing tone or voice of the other party. The external interface 122 allows communication of a control command, data and so forth between the CPU 121 and an external apparatus such as the display apparatus 123, inputting apparatus 124, audio outputting section 125 and terminal adapter section 100 (TA). The antenna 128 transmits and receives radio waves to and from the radio base station 2 shown in FIG. 1. The power supply apparatus 129 may use a battery or an AC power supply as an operating power supply and is capable of performing discrimination between a battery and an AC power supply and detection of a remaining amount of the battery. The radio control section 130 performs radio control such as call connection upon origination or termination of a call and switching of a connection upon movement to or from the unit radio area 8. The notification condition decision section 131 decides a notification condition based on the power supply information and the operation state of the CPU 81 and notifies the portable radio section 120 (MP) of the notification condition through the external interface 86. The circuit state acquisition and notification section 132 calculates a circuit state based on a notification condition of a notification received from the portable terminal section 80 (MT) and notifies the portable terminal section 80 (MT) of the circuit state through the external interface 122 when the calculated circuit state satisfies the condition.

In the following, operation of the radio portable terminal 1 of FIG. 6 when a communication application in which the radio data communication method is described is activated until a notification of a circuit state is received from the portable radio section 120 (MP) is described with reference to FIG. 7. If a data transmission opportunity first occurs by an operation of a user, then the communication application requests the data transmission/reception section 89 for establishment of a session (step S81) and waits until it receives a "session establishment success/failure" notification from the data transmission/reception section 89 (step S82).

In response to the session establishment success/failure notification, the data transmission/reception section 89 issues a connection request to the circuit control section 88 (step S83) and waits until it receives a "circuit connection success/failure" notification from the circuit control section 88 (step S84).

In response to the connection request, the circuit control section 88 confirms necessity/non-necessity for connection of a radio circuit from hardware setting of the portable terminal section 80 (MT) or presence or absence of the terminal adapter section 100 (TA) (step S85). If the discrimination is in the affirmative (Y in step S85), then the processing advances to step S87, in which the circuit control section 88 issues a request for notification of power supply information to the state notification section 90 (step S87). Then, the circuit control section 88 waits until a notification of a circuit state is received from the portable radio section 120 (MP) (step S88). On the other hand, if the discrimination is in the negative (N) in step S85, then the processing advances to step S86, in which the circuit control section 88 performs data transmission which is outside the scope of the present invention over the wire network (step S86).

In response to the request for notification of power supply information, the state notification section 90 notifies the notification condition decision section 131 of the portable radio section 120 (MP) of power supply information (step S89).

In response to the notification, the notification condition decision section 131 decides a notification condition of a circuit state (step S90).

In response to the notification condition, the circuit state acquisition and notification section 132 calculates a circuit state based on the decided notification condition (step S91) and confirms whether or not the calculated value clears the notification condition (step S92). If the discrimination is in the affirmative (Y in step S92), then the processing advances to step S94, in which the circuit state acquisition and notification section 132 notifies the portable terminal section 80 (MT) of the circuit state (step S91). On the other hand, if the discrimination is in the negative (N) in step S92, then the processing advances to step S93, in which the circuit state acquisition and notification section 132 abandons the state of the notification received (step S93).

Figure 8:
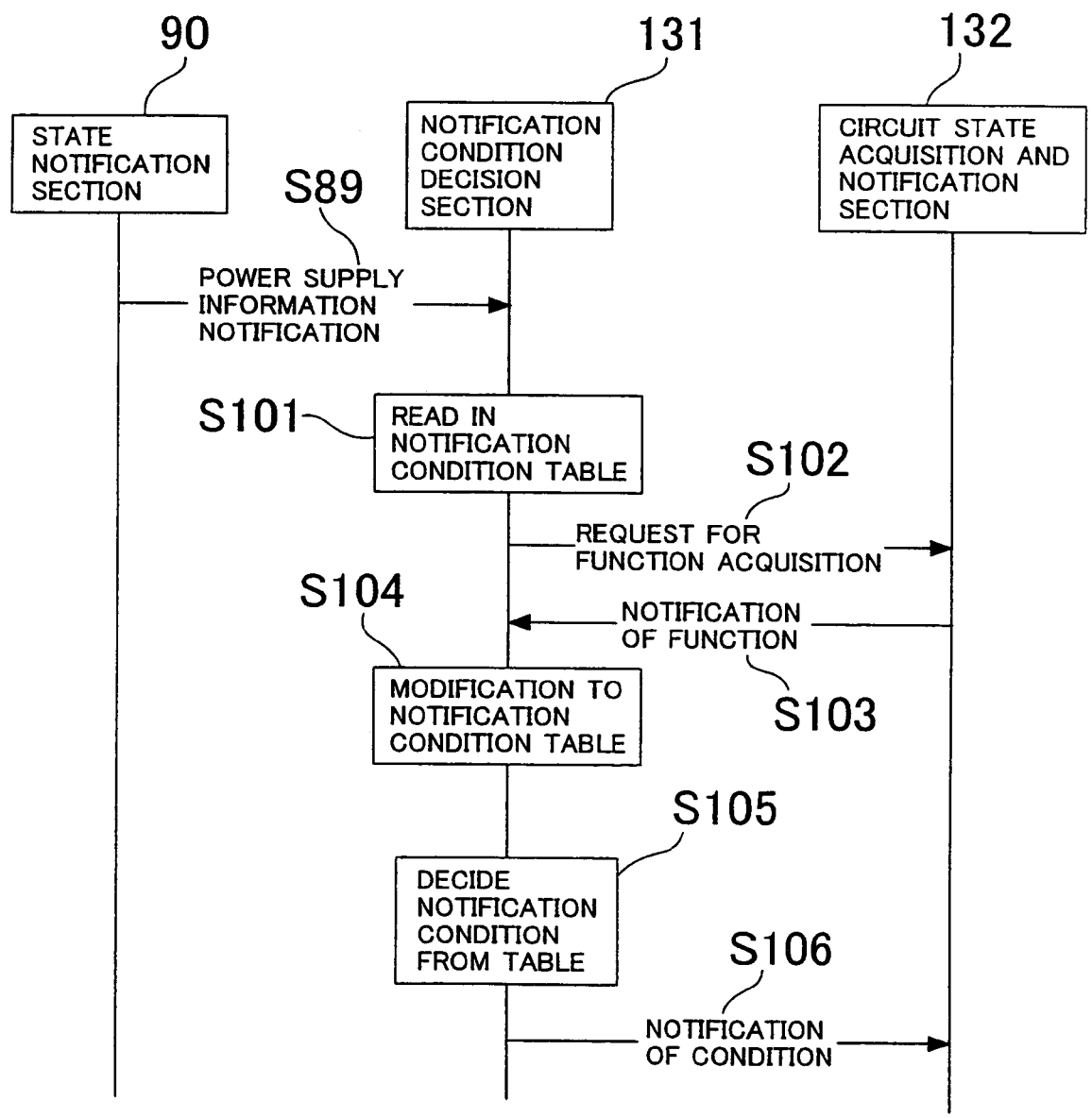
FIG. 8 is a flow chart illustrating a process of deciding a notification condition of a circuit state in step S90 of the flow chart of FIG. 7.

Now, the process of deciding a notification condition of a circuit state in step S90 is described with reference to FIG. 8. The notification condition decision section 131 first receives power supply information from the state notification section 90 of the portable terminal section 80 (MT) (step S89). Then, the notification condition decision section 131 reads in a selected one of notification condition decision tables given as Table 1, Table 2 and Table 3 below into the RAM 83 (step S101) and then issues a function acquisition request to the circuit state acquisition and notification section 132 (step S102). In response to the function acquisition request, the circuit state acquisition and notification section 132 notifies the notification condition decision section 131 of a minimum acquisition interval after which a circuit state can be acquired by the portable radio section 120 (MP) and a stage of the circuit state (step S103). In response to the notification, the notification condition decision section 131 modifies the contents of the selected table into such a table as given as Table 4 below based on the function of the notification received (step S104), decides a notification condition based on the information and the table (step S105) and notifies the circuit state acquisition and notification section 132 of the condition (step S106).

Figure 7:
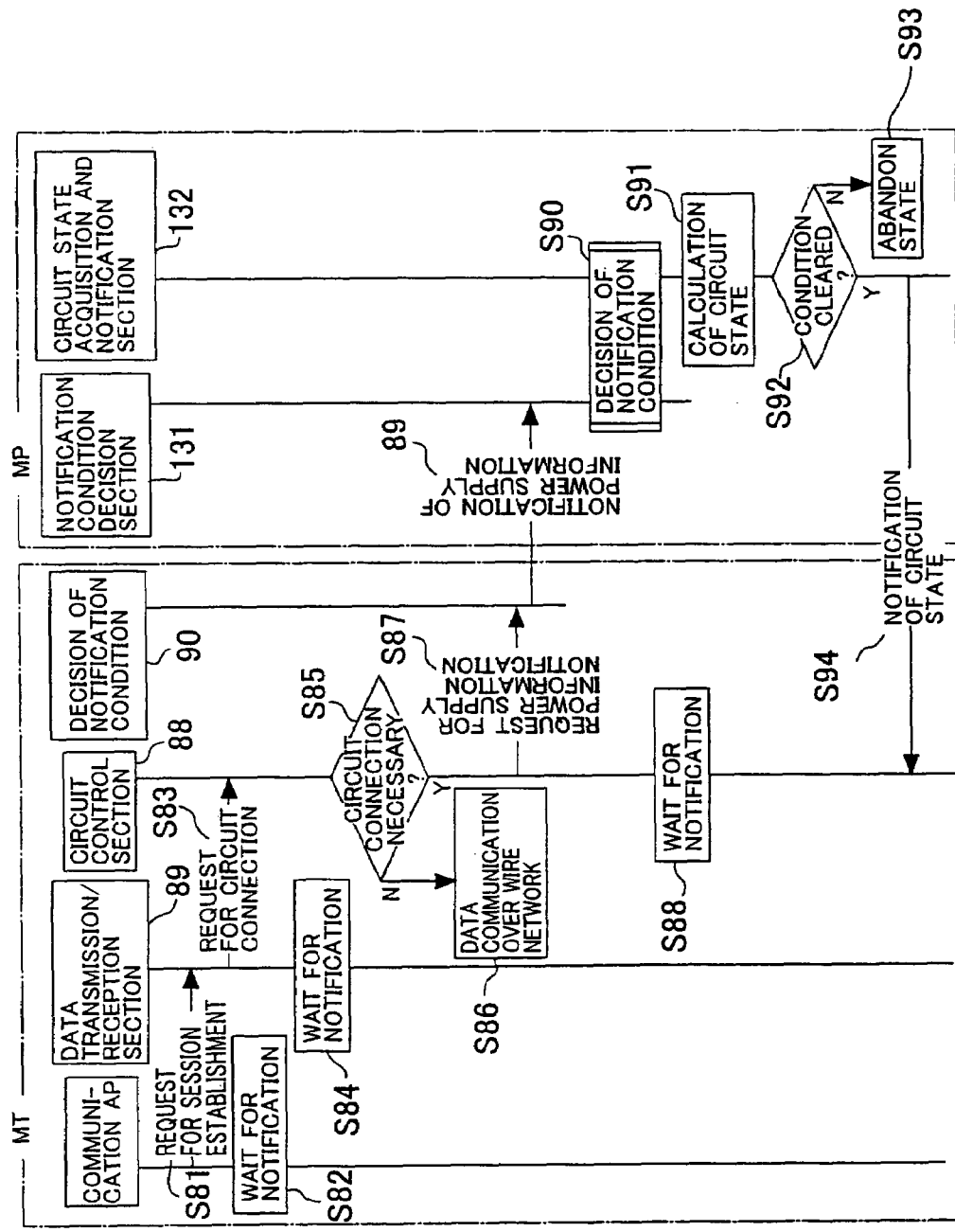
FIG. 7 is a flow chart illustrating operation of the radio data communication apparatus of FIG. 1 where the radio portable terminal shown in FIG. 6 is used.

The radio portable terminal 1 of FIG. 6 may be modified such that, in place of the function of notifying the notification condition decision section 131 of power supply information acquired from the power supply apparatus 87, a function of notifying the notification condition decision section 131 of a state of the CPU 81 is provided for the state notification section 90 and the process illustrated in FIG. 7 is executed by the modified radio portable terminal 1.

Further, the radio portable terminal 1 of FIG. 6 described above may be modified such that both of the function of notifying the notification condition decision section 131 of power supply information acquired from the power supply apparatus 87 and the function of notifying the notification condition decision section 31 of a state of the CPU 81 are provided for the state notification section 90 and the modified radio terminal 1 executes the process described above with reference to FIG. 7.

Figure 9:
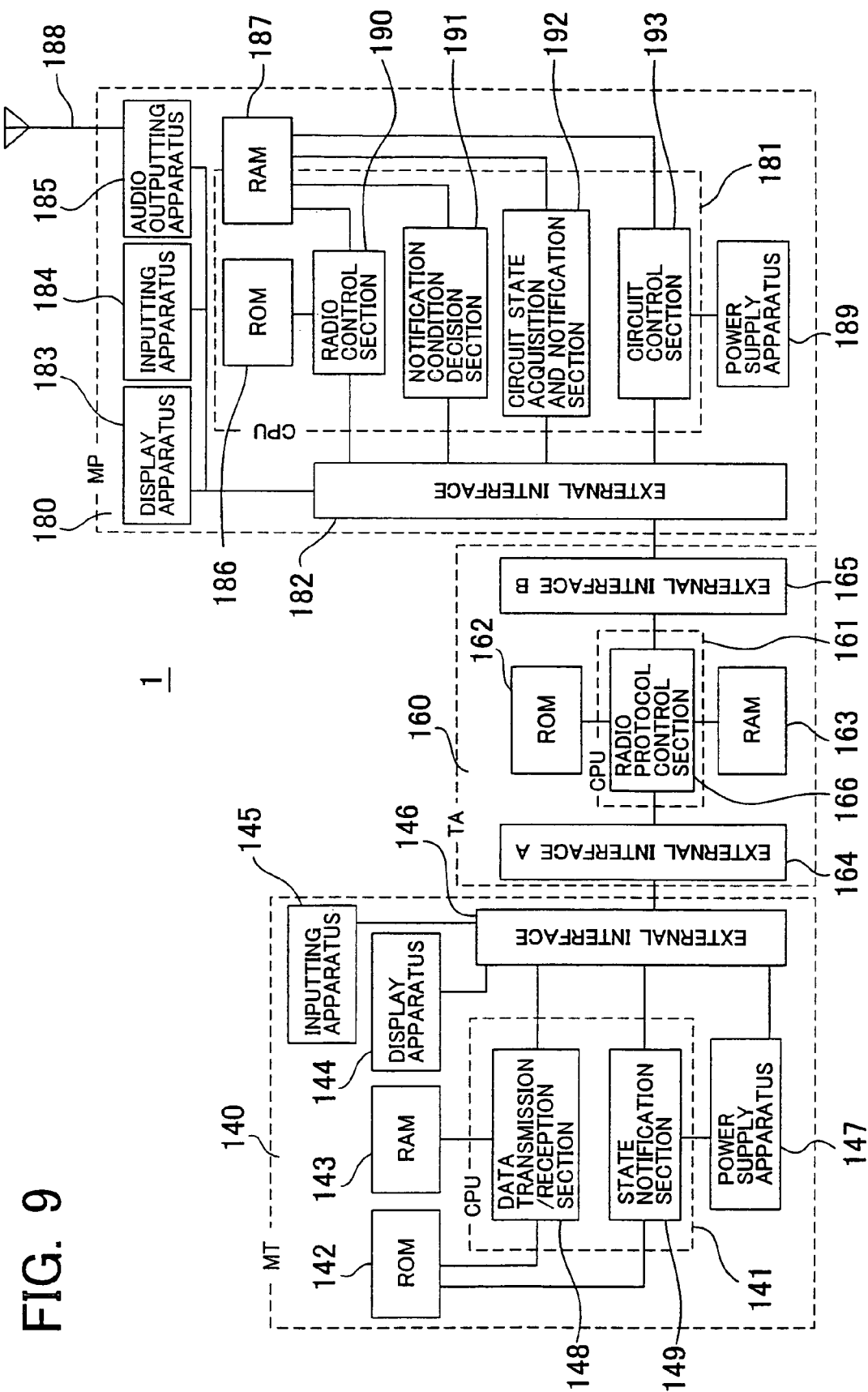
FIG. 9 is a block diagram showing a further form of the radio portable terminal of the radio data communication apparatus shown in FIG. 1.

Referring now to FIG. 9, there is shown a further form of the radio portable terminal 1 shown in FIG. 1. The radio portable terminal 1 shown in FIG. 9 is a modification to but is different from the radio portable terminal described hereinabove with reference to FIG. 2 in that components corresponding to the circuit control section 28 and the notification condition decision section 31 are included not in a component corresponding to the portable terminal section 20 (MT)

but in a component corresponding to the portable radio section 60 (MP). Referring to FIG. 9, the radio portable terminal 1 includes a portable terminal section 140 (MT), a terminal adapter section 160 (TA) and a portable radio section 180 (MP).

The portable terminal section 140 (MT) includes a CPU 141, a ROM 142, a RAM 143, a display apparatus 144, an inputting apparatus 145, an external interface 146, a power supply apparatus 147, a data transmission/reception section 148, and a state notification section 149.

The CPU 141 controls operation of the entire portable terminal section 140 (MT) and executes a program stored in the ROM 142 or/and the RAM 143 to enable the data transmission/reception section 148 and the state notification section 149. The CPU 141 thus has a plurality of operation states wherein, for example, the processing speed and the amount of power consumption of the power supply are different. The ROM 142 has control programs such as, for example, a BIOS and control data stored therein in advance. The RAM 143 temporarily or permanently stores a communication program, data to be transmitted or received, and so forth. The display apparatus 144 may be a CRT display unit, a LCD (Liquid Crystal Display) unit or any other suitable display unit and displays a display screen of a program, a circuit state or the like. The inputting apparatus 145 may be such as, for example, a keyboard or a pen and can be operated by a user to input required information. The external interface 146 allows communication of a control command, data and so forth between the CPU 141 and an external apparatus such as the display apparatus 144, inputting apparatus 145 or terminal adapter section 160 (TA). The power supply apparatus 147 may use a battery or an AC power supply as an operating power supply and can perform discrimination between a battery and an AC power supply and detection of a remaining amount of the battery. The data transmission/reception section 148 transmits and receives data to and from the information server machine 7 of FIG. 1 after a circuit is connected. The state notification section 149 notifies a notification condition decision section 191 of power supply information acquired from the power supply apparatus 147 and an operation state of the CPU 141.

The terminal adapter section 160 (TA) includes a CPU 161, a ROM 162, a RAM 163, an external interface A 164, another external interface B 165, and a radio protocol control section 106.

The CPU 161 controls operation of the entire terminal adapter section 160 (TA) and executes a program stored in the ROM 162 or the RAM 163 to enable the radio protocol control section 106. The ROM 162 has control programs such as, for example, a BIOS and control data stored therein in advance. The RAM 163 temporarily stores a control command or data to be outputted to or inputted from the external interface A 164 or B 165. The external interface A 164 allows communication of a control command, data or the like between the portable terminal section 140 (MT) and the CPU 161. The external interface B 165 allows communication of a control command, data or the like between the portable radio section 180 (MP) and the CPU 161. The radio protocol control section 106 performs processing based on specifications for performing data communication in such a radio environment as the PIAFS.

The portable radio section 180 (MP) includes a CPU 181, a ROM 186, a RAM 187, a display apparatus 183, an inputting apparatus 184, an audio outputting apparatus 185, an external interface 182, an antenna 188, a power supply apparatus 189, a radio control section 190, a notification condition decision section 191, a circuit state acquisition and notification section 192, and a circuit control section 193, The CPU 181 controls operation of the entire portable radio section 180 (MP) and executes a program stored in the ROM 186 or the RAM 187 to enable the radio control section 190 and the circuit state acquisition and notification section 192. The ROM 186 has, for example, a telephone number of the terminal and so forth stored in advance therein. The RAM 187 temporarily or permanently stores a control program, a telephone number of the other party and so forth. The display apparatus 183 may be, for example, a LCD and displays a communication state, a telephone number of the other party and so forth. The inputting apparatus 184 may be, for example, a button and can be operated by a user to input required information. The audio outputting apparatus 185 outputs a ringing tone or voice of the other party. The external interface 182 allows communication of a control command, data and so forth between the CPU 181 and an external apparatus such as the display apparatus 183, inputting apparatus 184, audio outputting apparatus 185 and terminal adapter section 160 (TA). The antenna 188 transmits and receives radio waves to and from the radio base station 2 shown in FIG. 1. The power supply apparatus 189 may use a battery or an AC power supply as an operating power supply and is capable of performing discrimination between a battery and an AC power supply and detection of a remaining amount of the battery. The radio control section 190 performs processing regarding radio control such as call connection upon origination or termination of a call and switching of a connection upon movement from or to the unit radio area 8 shown in FIG. 1. The notification condition decision section 191 decides a notification condition based on the power supply information and the operation state of the CPU 141 and notifies the portable radio section 180 (MP) of the notification condition through the external interface 146. The circuit state acquisition and notification section 192 calculates a circuit state based on the notification condition of the notification received from the portable terminal section 140 (MT) and notifies the portable terminal section 140 (MT) of the circuit state through the external interface 182 when the calculated circuit state satisfies the condition. The circuit control section 193 connects a circuit at a timing at which the notification of the circuit state is received from the portable radio section 180 (MP).

In the following, operation of the ratio portable terminal 1 of FIG. 9 when a communication application in which the radio data communication method is described is activated and a circuit is connected at a timing at which a circuit state satisfies a connection condition is described with reference to FIG. 10. If a data transmission opportunity first occurs by an operation of a user, then the communication application requests the data transmission/reception section 148 for establishment of a session (step S121) and waits until it receives a "session establishment success/failure" notification from the data transmission/reception section 148 (step S122).

In response to the session establishment success/failure notification, the data transmission/reception section 148 confirms necessity/non-necessity for connection of a radio circuit from hardware setting of the portable terminal section 140 (MT) or presence or absence of the terminal adapter section 160 (TA) (step S123). If the discrimination is in the affirmative (Y in step S123), then the processing advances to step S125, but if the discrimination is in the negative (N in step S12), then the processing advances to step S124. In step S124, the data transmission/reception section 148 performs data transmission which is outside the scope of the present invention over the wire network. In step S125, the data transmission/reception section 148 issues a request for notification of power supply information to the state notification section 149, and waits until a "circuit connection success/failure" notification is received from the circuit control section 193 of the portable radio section 180 (MP) (step S126).

In response to the request for notification of power supply information from the data transmission/reception section 148, the state notification section 149 notifies the notification condition decision section 191 of the portable radio section 180 (MP) of power supply information (step S127). In response to the notification, the notification condition decision section 191 decides a notification condition of a circuit state (step S128).

The circuit state acquisition and notification section 192 calculates a circuit state based on the decided notification condition (step S129) and confirms whether or not the calculated value clears the notification condition (step S130). If the discrimination is in the affirmative (Y in step S130), then the processing advances to step 132, but if the discrimination is in the negative (N in step S130), then the processing advances to step 131. In step S131, the circuit state acquisition and notification section 192 abandons the state of the notification received. In step S132, the circuit state acquisition and notification section 192 issues a circuit connection request to the circuit control section 193.

Thereafter, the circuit control section 193 performs establishment of a circuit to the radio base station 2 shown in FIG. 1 (step S133). Here, the process in step S133 is similar to that in steps S101 to S106 described herein above with reference to FIG. 8.

The radio portable terminal 1 of FIG. 9 may be modified such that the state notification section 147 is replaced by a CPU state notification section which issues a notification of a state of the CPU 141 and the process illustrated in FIG. 10 is executed by the modified radio portable terminal 1.

Further, the radio portable terminal 1 of FIG. 9 described above may be modified such that the state notification section 147 is replaced by a power supply information and CPU state notification section which issues a notification of a state of the power supply and a state of the CPU 141 and the process illustrated in FIG. 10 is executed by the modified radio portable terminal 1.

As described above, with the radio data communication apparatus and the radio data communication method described above, even in a situation wherein a circuit state is bad and unstable, it can be prevented to repeat acquisition of an electric field strength and discrimination of whether or not connection is possible until the circuit state becomes good. As a result, such an effect that drop of a processing speed of a portable terminal can be prevented and increase of amounts of power consumption of the portable terminal and a radio unit can be prevented is exhibited.

It is to be noted that apparently the present invention is not limited to the embodiment described above and the embodiment can be altered suitably within the technical scope of the present invention. Further, the numbers, positions, shapes and so forth of the components described above are not limited to those of the embodiment, and such numbers, positions, shapes and so forth that are suitable in carrying out the present invention can be employed.

What is claimed is:

1. A radio data communication apparatus, comprising:
   a radio portable terminal including a portable terminal section for deciding a notification condition of a circuit state between the radio portable terminal and a base station based on information of power supplied to said portable terminal section and issuing a notification of the notification condition, and a portable radio section for receiving the notification of the notification condition and notifying said portable terminal section of the circuit state when the circuit state satisfies the notification condition received from said portable terminal section;
   said radio portable terminal being operable to connect a radio circuit based on the circuit state of the notification received from said portable radio section to transmit and receive data to and from a server over a radio communication network, a public network and a wire communication network.

2. A radio data communication apparatus as claimed in claim 1, wherein said portable terminal section includes means for notifying said portable radio section of the power supply information supplied to said portable terminal section, and said portable radio section includes means for deciding a notification condition of the circuit state based on the power supply information of the notification received and notifying said portable terminal section of the circuit state when the circuit state satisfies the notification condition.

3. A radio data communication apparatus as claimed in claim 1, wherein said portable terminal section includes means for notifying said portable radio section of the information of the power supply supplied to said portable terminal section, and said portable radio section includes means for determining a notification condition of the circuit state based on the power supply information of the notification received and connecting a circuit when the circuit state satisfies the notification condition.

4. A radio data communication apparatus as claimed in claim 1, wherein the power supply information includes power supply type information which is information indicative of whether the power supply being supplied is an ac power supply or a battery, and information indicative of a battery remaining amount where the power supply is a battery.

5. A radio data communication apparatus as claimed in claim 1, wherein the circuit state includes at least one of a reception electric field strength which is a strength of radio waves received from a radio base station by said portable radio section, and a state of a circuit indicated by an error rate of control data received from the radio base station by said portable radio section.

6. A radio data communication apparatus as claimed in claim 1, wherein said portable terminal section includes means for determining a notification condition of the circuit state based on an operation state of a CPU of said portable terminal section and notifying said portable radio section of the notification condition, and said portable radio section includes means for notifying said portable terminal section of the circuit state when the circuit state satisfies the condition received from said portable terminal section.

7. A radio data communication apparatus as claimed in claim 1, wherein said portable terminal section includes means for notifying said portable radio section of an operation state of a CPU of said portable terminal section, and said portable radio section includes means for deciding a notification condition of the circuit state based on the operation state of said CPU of the notification received and notifying said portable terminal section of the circuit state when the circuit state satisfies the notification condition.

8. A radio data communication apparatus as claimed in claim 1, wherein said portable terminal section includes means for notifying said portable radio section of an operation state of a CPU of said portable terminal section, and said portable radio section includes means for deciding a notification condition of the circuit state based on the operation state of said CPU of the notification received and connecting a circuit when the circuit state satisfies the notification condition.

9. A radio data communication apparatus as claimed in claim 6, wherein the operation state of said CPU is selected from a plurality of predetermined operation states wherein a processing speed of said CPU and/or an amount of power consumption of the power supply are different.

10. A radio data communication method, comprising:
   a portable terminal step performed by a portable terminal section of a radio portable terminal for deciding a notification condition of a circuit state between the radio portable terminal and a base station based on information of power supply supplied to said portable terminal section and issuing a notification of the notification condition;
   a portable radio step performed by said radio portable terminal for receiving the notification of the notification condition and notifying the portable terminal section of the circuit state when the circuit state satisfies the condition received from the portable terminal step; and
   a connection step performed by said radio portable terminal of connecting a radio circuit based on the circuit condition of the notification received from the portable radio step to transmit and receive data to and from a server over a radio communication network, a public network and a wire communication network.

11. A radio data communication method as claimed in claim 10, wherein the portable terminal step includes a step of notifying the portable radio step of the power supply information supplied to the portable terminal step, and the portable radio step includes a step of deciding a notification condition of the circuit state based on the power supply information of the notification received and notifying the portable terminal step of the circuit state when the circuit state satisfies the condition.

12. A radio data communication method as claimed in claim 10, wherein the portable terminal step includes a step of notifying the portable radio step of the information of the power supplied to the portable terminal step, and the portable radio step includes a step of determining a notification condition of the circuit state based on the power supply information of the notification received and connecting a circuit when the circuit state satisfies the condition.

13. A radio data communication method as claimed in claim 10, wherein the power supply information includes power supply type information which is information indicative of whether the power supply being supplied is ac power supply or a battery, and information indicative of a battery remaining amount where the power supply is a battery.

14. A radio data communication method as claimed in claim 10, wherein the circuit state includes at least one of a reception electric field strength which is a strength of radio waves received from a radio base station by the portable radio step, and a state of a circuit indicated by an error rate of control data received from the radio base station by the portable radio step.

15. A radio data communication method as claimed in claim 10, wherein the portable terminal step includes a step of determining a notification condition of the circuit state based on an operation state of a CPU of the portable terminal step and notifying the portable radio step of the notification condition, and the portable radio step includes a step of notifying the portable terminal step of the circuit state when the circuit state satisfies the condition received from the portable terminal step.

16. A radio data communication method as claimed in claim 10, wherein the portable terminal step includes a step of notifying the portable radio step of an operation state of a CPU of the portable terminal step, and the portable radio step includes a step of deciding a notification condition of the circuit state based on the operation state of said CPU of the notification received and notifying the portable terminal step of the circuit state when the circuit state satisfies the condition.

17. A radio data communication method as claimed in claim 10, wherein the portable terminal step includes a step of notifying the portable radio step of an operation state of a CPU of the portable terminal step, and the portable radio step includes a step of deciding a notification condition of the circuit state based on the operation state of said CPU of the notification received and connecting a circuit when the circuit state satisfies the condition.

18. A radio data communication method as claimed in claim 15, wherein the operation state of said CPU is selected from a plurality of predetermined operation states wherein a processing speed of said CPU and/or an amount of power consumption of the power vary.

19. A radio data communication apparatus as claimed in claim 4, wherein the portable radio terminal decides the notification condition by selecting a first notification condition from a plurality of predetermined notification conditions when the power supply type information indicates the ac power supply,
   wherein the portable radio terminal decides the notification condition by selecting a second notification condition from the predetermined notification conditions when the power supply type information indicates the battery and the battery remaining amount is within a first predetermined range, and
   wherein the portable radio terminal decides the notification condition by selecting a third notification condition from the predetermined notification conditions when the power supply type information indicates the battery and the battery remaining amount is within a second predetermined range.

20. A radio data communication method as claimed in claim 13, wherein the portable terminal step includes:
   deciding the notification condition by selecting a first notification condition from a plurality of predetermined notification conditions when the power supply type information indicates the ac power supply,
   deciding the notification condition by selecting a second notification condition from the predetermined notification conditions when the power supply type information indicates the battery and the battery remaining amount is within a first predetermined range, and
   deciding the notification condition by selecting a third notification condition from the predetermined notification conditions when the power supply type information indicates the battery and the battery remaining amount is within a second predetermined range.

* * * * *